(12) United States Patent
Fritz (10) Patent No.: US 6,957,486 B2
(45) Date of Patent: Oct. 25, 2005

(54) DEVICE AND PROCESS FOR THE PRODUCTION OF GASKET LAYERS

(75) Inventor: Wolfgang Fritz, Metzingen (DE)

(73) Assignee: Elring Klinger AG, Dettingen (DE)

(*) Notice: Subject to any disclaimer, the term of this patent is extended or adjusted under 35 U.S.C. 154(b) by 0 days.

(21) Appl. No.: 09/892,052

(22) Filed: Jun. 26, 2001

(65) Prior Publication Data

US 2002/0152612 A1 Oct. 24, 2002

(30) Foreign Application Priority Data

Jun. 30, 2000 (DE) ............................... 100 31 095

(51) Int. Cl.$^7$ .............................................. B23P 17/00
(52) U.S. Cl. ..................... 29/888.3; 29/411; 29/412; 29/415; 29/417; 29/564.1; 277/626; 277/654
(58) Field of Search .................. 29/411, 412, 415, 29/417, 501, 564.6; 277/626, 654

(56) References Cited

U.S. PATENT DOCUMENTS

| | | | |
|---|---|---|---|
| 2,034,610 A | * | 3/1936 | Dickson ............... 277/601 |
| 2,753,199 A | * | 7/1956 | Victor ................. 277/592 |
| 3,037,271 A | * | 6/1962 | Schilberg |
| 3,548,483 A | * | 12/1970 | Graf et al. |
| 3,661,401 A | * | 5/1972 | Farnam |
| 3,694,889 A | * | 10/1972 | Pommier |
| 3,822,461 A | * | 7/1974 | Malmstrom |
| 3,998,300 A | * | 12/1976 | Sullivan |
| 4,328,665 A | * | 5/1982 | Taubert et al. |
| 4,344,342 A | | 8/1982 | Garvin ................. 83/45 |
| 4,776,601 A | * | 10/1988 | Yamada ............... 277/598 |
| 4,826,708 A | * | 5/1989 | Udagawa |
| 4,862,574 A | * | 9/1989 | Seidy |
| 5,210,943 A | * | 5/1993 | Berkun et al. ......... 29/888.3 |
| 5,226,306 A | * | 7/1993 | Yoshino et al. |
| 5,297,806 A | * | 3/1994 | Kestly |

(Continued)

FOREIGN PATENT DOCUMENTS

| | | |
|---|---|---|
| DE | 884 936 | 7/1953 |
| DE | 31 35 021 | 3/1983 |
| DE | 44 15 415 | 11/1995 |

(Continued)

*Primary Examiner*—Eric Compton (57) ABSTRACT

In order to provide a device for the production of gasket layers for single or multiple layered gaskets from one respective gasket layer section of a starting material comprising several continuous gasket layer sections, comprising a follow-on combination tool with several machining stations which follow one another along a direction of feed and in which the gasket layer sections are machined during operating cycles, wherein at least one of the machining stations is designed as a station for cutting outer contour lines, in which facing outer contour lines of two adjacent gasket layers are cut by means of a tool for cutting outer contour lines, and a feeding device, by means of which the gasket layer sections are moved further along the direction of feed by a feed distance v between two operating cycles, with which the outer contour lines of the gasket layers are cut with less resources and the starting material can be better utilized it is suggested that the tool for cutting outer contour lines be designed such that the outer contour lines of the two adjacent gasket layers are cut with the same cutting edge and that the feed distance v be essentially the same as the extension b of the outer contour of a finished gasket layer or a group of finished gasket layers along the direction of feed.

15 Claims, 6 Drawing Sheets

U.S. PATENT DOCUMENTS

5,320,200 A * 6/1994 Hashimoto
5,433,455 A * 7/1995 Nelson
5,582,415 A * 12/1996 Yoshida et al. ............. 277/592

FOREIGN PATENT DOCUMENTS

| EP | 0 338 537 A2 | 10/1989 |
| EP | 0 676 279 A1 | 10/1995 |
| GB | 2 294 660 | 5/1996 |
| JP | 55-164138 | * 12/1980 |
| JP | 56-021737 | * 2/1981 |
| JP | 06207673 | 7/1994 |
| JP | 7-35239 | 2/1995 |

* cited by examiner

DEVICE AND PROCESS FOR THE PRODUCTION OF GASKET LAYERS

BACKGROUND OF THE INVENTION

The present invention relates to a device for the production of gasket layers for single or multiple layered gaskets from one respective gasket layer section of a starting material comprising several continuous gasket layer sections, comprising a follow-on combination tool with several machining stations which follow one another along a direction of feed and in which the gasket layer sections are machined during operating cycles, wherein at least one of the machining stations is designed as a station for cutting outer contour lines, in which facing outer contour lines of two adjacent gasket layers are cut by means of a tool for cutting outer contour lines, and a feeding device, by means of which the gasket layer sections are moved further along the direction of feed by a feed distance v between two operating cycles.

Devices of this type are known from the state of the art.

As a result of combining several machining steps in one follow-on combination tool, the tool costs are reduced in relation to the use of individual tools and the transit times of the gasket layer sections through the machining stations are decreased.

In the case of the known devices of the type specified at the outset, the feed distance v is greater than the extension b of the outer contour of a finished gasket layer along the direction of feed and so a distance v-b is maintained between the rear edge of a gasket layer located in front in the direction of feed and the front edge of a gasket layer located behind it in the direction of feed.

This distance between gasket layers following one another along the direction of feed results in the starting material which is arranged between the facing outer contour lines of two adjacent gasket layers remaining unused. In addition, the facing outer contour lines of two adjacent gasket layers must be cut by two different cutting edges.

The object underlying the present invention is therefore to provide a device of the type specified at the outset, with which the outer contour lines of the gasket layers are cut with low resources and the starting material can be better utilized.

SUMMARY OF THE INVENTION

This object is accomplished in accordance with the invention, in a device having tooling features, in that the tool for cutting outer contour lines is designed such that the outer contour lines of the two adjacent gasket layers are cut with the same cutting edge and that the feed distance v is essentially the same as the extension b of the outer contour of a finished gasket layer or a group of finished gasket layers along the direction of feed.

The follow-on combination tool of the inventive device manages with a tool for cutting outer contour lines which is of a simple construction and comprises only a single cutting edge for each pair of adjacent gasket layers.

Since the tool for cutting outer contour lines cuts only along one cutting edge for separating the pair of adjacent gasket layers, the force, with which the tool for cutting outer contour lines must be guided against the starting material, is smaller than in the case of the known follow-on combination tools, with which the tool for cutting outer contour lines must have at least two cutting edges for each pair of adjacent gasket layers. On account of the reduced cutting force, the noise generated during the cutting of the outer contour lines also decreases.

Furthermore, in the case of the inventive device the facing outer contour lines of two adjacent gasket layers abut directly on one another and so no waste material results between the adjacent gasket layers and the starting material is utilized better.

The gasket layers can, in particular, be gasket plates which are produced from a metallic starting material and from which a single or multiple layered metal gasket is formed.

The gasket layers can, however, also be produced from a soft material and used for forming a single or multiple layered soft material gasket.

In this respect, it may be provided for a single finished gasket layer to be produced from each respective gasket layer section. In this case, the feed distance v is essentially the same as the extension b of the outer contour of this finished gasket layer along the direction of feed.

However, it may also be provided for a group of gasket layers comprising several individual gasket layers to be produced from each gasket layer section of the starting material. In this case, the feed distance v is essentially the same as the extension b of the outer contour of the group of finished gasket layers. The extension of the outer contour of the group of finished gasket layers can, in this respect, be greater than the extension of the outer contour of a single gasket layer from the group of gasket layers.

The gasket layers of a group of gasket layers can have outer contours which are the same as one another or different to one another.

Even when the gasket layers of a group of gasket layers have outer contours the same as one another, they can be arranged in the gasket layer section with the same alignment or an alignment differing from one another. It can, in particular, be provided for two adjacent gasket layers of the same group of gasket layers to be designed and arranged essentially point symmetric to one another.

The two, adjacent gasket layers, the outer contour lines of which are cut in accordance with the invention with the same cutting edge, can belong to the same group of gasket layers or, however, to two consecutive groups of gasket layers.

The gasket layers belonging to the same group of gasket layers can be separated from one another in the station for cutting outer contour lines or in a further machining station located in front of or behind the station for cutting outer contour lines.

In a preferred development of the inventive device it is provided for at least one of the machining stations to be designed as a free-cutting station which is arranged in front of the station for cutting outer contour lines in the direction of feed and in which at least one free-cutting area is cut out of the starting material, the cutting edge of the tool for cutting outer contour lines of the station for cutting outer contour lines dipping into this area during the cutting procedure. As a result of this free-cutting, it is possible for the outer contour lines of the gasket layers to be cut in the station for cutting outer contour lines cleanly and without any undesired deformations of the edges of the gasket layers.

Furthermore, the free-cutting tool of the free-cutting station is advantageously designed such that the edge of the free-cutting area extends transversely to the outer contour lines cut by the tool for cutting outer contour lines. As a result, it is possible to use in the free-cutting station those punches which have a rounded shape to their cutting edge.

Such free-cutting punches are simple to produce and are subject only to slight wear and tear.

However, as a result of the fact that the edge of the free-cutting area extends transversely to the outer contour lines cut by the tool for cutting outer contour lines a sharp-edged transition results between the free-cutting lines cut in the free-cutting station, on the one hand, and the outer contour lines cut in the station for cutting outer contour lines, on the other hand, with a corner at the point, at which the lines specified above meet one another.

The edge of the free-cutting area preferably extends essentially at right angles to the outer contour lines cut by the tool for cutting outer contour lines.

In a preferred development of the inventive device it is provided for the station for cutting outer contour lines to be designed as a separating station, in which the adjacent gasket layers are separated completely from one another.

This station for cutting outer contour lines designed as a separating station can, in particular, be the last machining station of the follow-on combination tool in the direction of feed.

A clean separation of the facing outer contour lines of two adjacent gasket layers is advantageously achieved in that the surfaces of the tool for cutting outer contour lines which form the cutting edge form with one another an angle of approximately 90°.

The present invention relates, in addition, to a process for the production of gasket layers for single or multiple layered gaskets from one respective gasket layer section of a starting material comprising several continuous gasket layer sections, with which the gasket layer sections are machined during operating cycles in a follow-on combination tool having several machining stations following one another along a direction of feed, wherein at least one of the machining stations is designed as a station for cutting outer contour lines, in which facing outer contour lines of two adjacent gasket layers are cut by means of a tool for cutting outer contour lines, and with which the gasket layer sections are moved further along the direction of feed by a feed distance v by means of a feeding device between two operating cycles.

A further object of the present invention is to provide a process of the type specified above, with which the outer contour lines of the gasket layers are cut with low resources and the starting material is better used than in the case of the known processes.

This object is accomplished in accordance with the invention, in a process having process features, in that the outer contour lines of the two adjacent gasket layers are cut with the same cutting edge of the tool for cutting outer contour lines and that the feed distance v is selected to be essentially the same as the extension b of the outer contour of a finished gasket layer or a group of finished gasket layers along the direction of feed.

The advantages of the inventive process have already been explained in the above in conjunction with the inventive device.

Special developments of the inventive process are the subject matter of the dependent process claims, the advantages of which have likewise already been explained in the above in conjunction with special developments of the inventive device.

If a free-cutting tool with a rounded, corner-free cutting edge is used during the production of the gasket, the outer contour of the gasket layer comprises a free-cutting line cut by the free-cutting tool and an outer contour line cut by the tool for cutting outer contour lines, these two lines together forming a corner.

In order to exclude the risk of injury when handling this gasket, it can be advantageously provided for the gasket to comprise at least one additional gasket layer which projects beyond the corner on the first gasket layer.

In addition or alternatively hereto it may be provided for the gasket to comprise at least one additional gasket layer which comprises an outer contour line section which follows the course of the outer contour line or the course of the free-cutting line and which is smoothly adjoined in the area of the corner of the first gasket layer by a second outer contour line section.

The additional gasket layer of the gasket can be produced, in particular, by means of a follow-on combination tool, with which the feed distance v is greater than the extension b of the outer contour of the finished gasket layer along the direction of feed.

Additional features and advantages of the invention are the subject matter of the following description and drawings illustrating embodiments.

DESCRIPTION OF THE DRAWINGS

In the drawings.

The same or functionally equivalent elements are designated with the same reference numerals in all the Figures.

DESCRIPTION OF THE INVENTION

Figure 1:
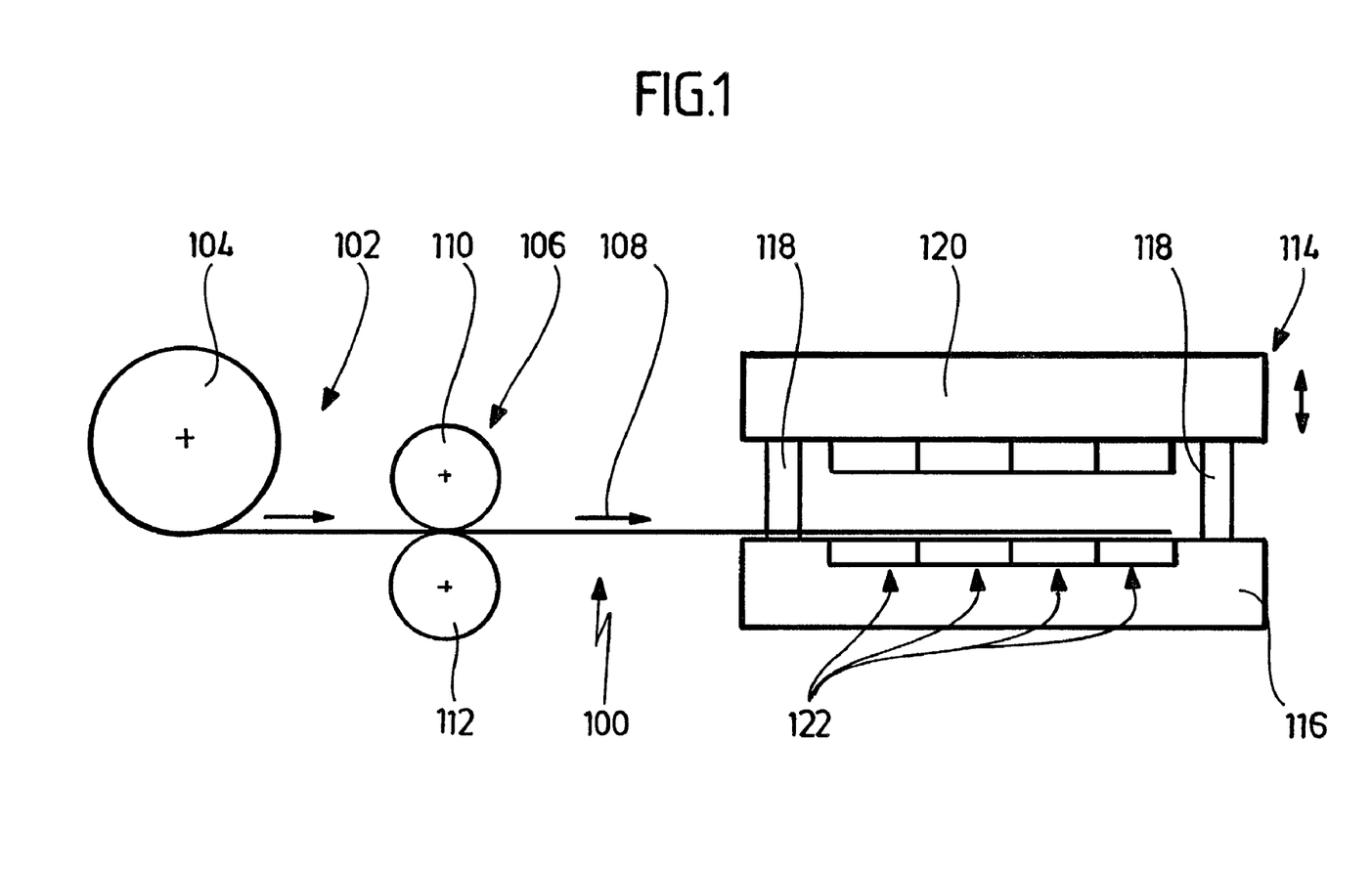
FIG. 1 shows a schematic, basic illustration of a follow-on combination tool for the production of gasket plates for metal gaskets.

A device for the production of gasket plates for metal gaskets which is designated as a whole as 100 and illustrated schematically in FIG. 1 comprises a supply device 102 for starting material which, for its part, comprises a holder (not illustrated) for rotatably holding a roll of sheet metal 104 and a feeding device 106 which operates in cycles and conveys the sheet metal withdrawn from the roll of sheet metal 104 along the direction of feed 108 by a predetermined feed distance during a feed cycle.

The feeding device 106 can comprise, for example, a drive roller 110 and a pressure roller 112 arranged parallel thereto, wherein the sheet metal to be conveyed passes through the gap between the drive roller 110 and the pressure roller 112 and is moved forwards along the direction of feed 108 due to the friction with the casing surface of the drive roller 110 which turns during a feed cycle.

The feeding device 106 conveys the sheet metal as starting material into a follow-on combination tool which is designated as a whole as 114 and comprises a stationary tool lower part 116 and a tool upper part 120 which is guided for displacement on vertical guide bars 118 and can be displaced relative to the stationary tool lower part 116 by means of a mechanical, pneumatic or hydraulic moving device (not illustrated).

The follow-on combination tool 114 comprises several machining stations 122 which follow one another along the direction of feed 108 and each have machining tools, such as, for example, punching, embossing or cutting tools, arranged on the tool lower part 116 and/or on the tool upper part 120.

During an operating cycle of the follow-on combination tool 114, the tool upper part 120 is moved from above against the sheet metal lying on the tool lower part 116, wherein the gasket plate sections 124 (cf. FIGS. 2 and 3) located in the consecutive machining stations 122 are machined at the same time by the tools arranged in the respective machining stations 122, i.e. are, for example, punched, embossed or cut.

In order to position the gasket plate sections exactly relative to the machining stations 122, it may be provided for one or more position holes to be punched into each gasket plate section in a first machining station and for each of the following machining stations to have a corresponding number of positioning pins on the tool upper part 120 which engage in the respectively associated position holes during the downward movement of the tool upper part 116 and thus bring the gasket plate sections 124 into the desired position relative to the respective machining station 122 and secure them in this position.

During the movement of the tool upper part 120 back into its upper starting position, the positioning pins exit again from the associated positioning holes. As a result, an operating cycle of the follow-on combination tool 114 is completed.

During the following feed cycle of the follow-on combination tool 114, the sheet metal and, therefore, each of the gasket plate sections 124 is moved forwards along the direction of feed 108 by the predetermined feed distance, which corresponds to the width of one gasket plate section 124, by means of the feeding device 106.

When the sheet metal comes to rest again after completion of the feeding movement, the next operating cycle of the follow-on combination tool 114 begins with the lowering of the tool upper part 120.

Figure 2:
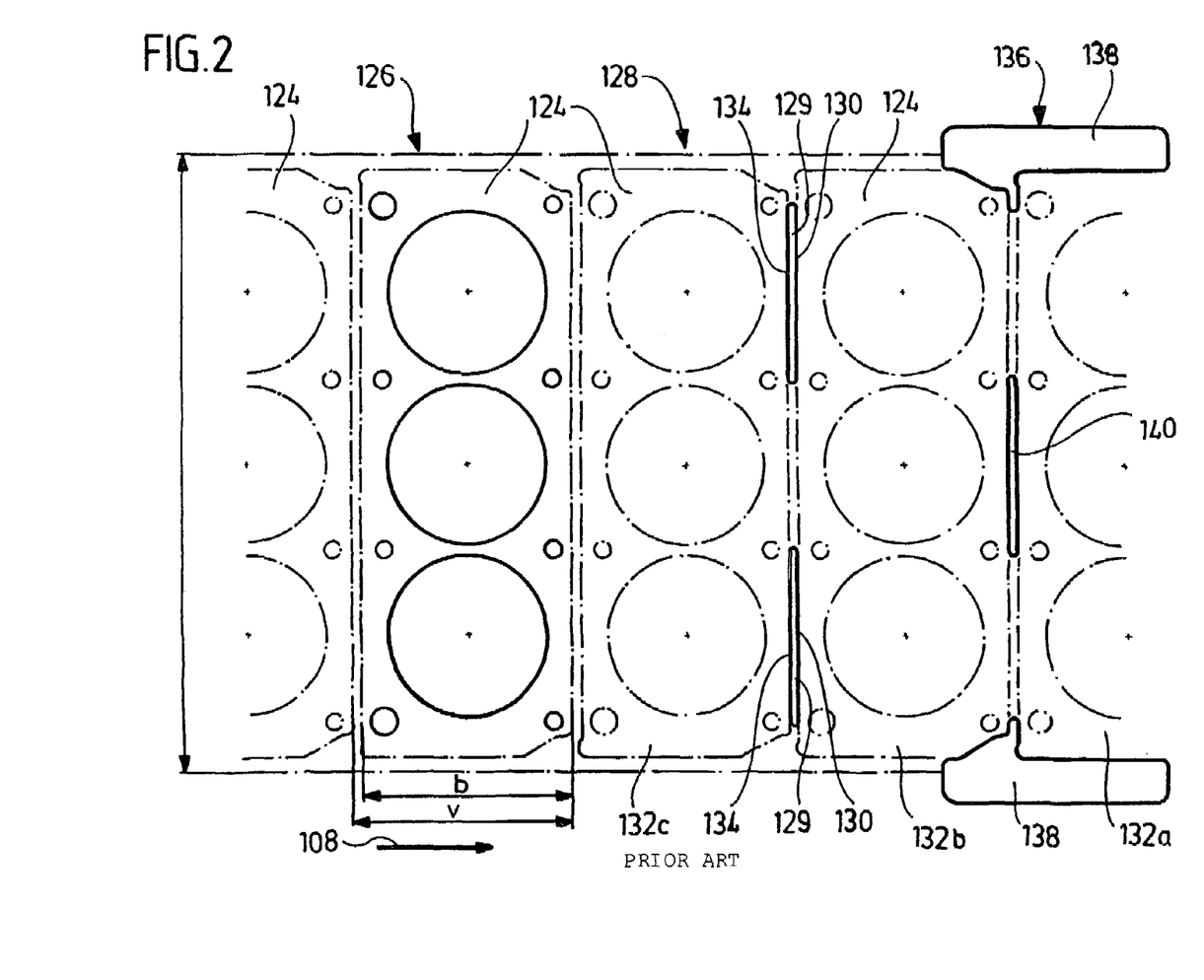
FIG. 2 shows a schematic illustration of the consecutive machining steps in a conventional follow-on combination tool.

FIG. 2 shows schematically the consecutive machining steps in a conventional follow-on combination tool, with which the feed distance v and thus the width of the gasket plate sections 124 is greater than the width b of the outer contour of the finished gasket plate, i.e. the extension of a finished gasket plate b along the direction of feed 108.

In a first machining station designed as a punching station 126, the gasket plate section 124 located therein during an operating cycle is punched by means of suitable punches, i.e. provided with the necessary openings (e.g. combustion chamber openings and openings for water and oil channels).

In a second machining station which follows the punching station 126 along the direction of feed 108 and which is designed as a free-cutting station 128, two free-cutting areas 129 are cut out of the sheet metal by means of (for example) two free-cutting punches, the front edges 130 of these free-cutting areas forming outer contour lines of a gasket plate 132b located further forwards in the direction of feed 108 whereas their rear edges 134 form outer contour lines of a gasket plate 132c located further rearwards in the direction of feed 108.

The front edges 130 and the rear edges 134 are cut in the free-cutting station 128 at the same time but by different cutting edges of the free-cutting punches spaced from one another along the direction of feed 108 by the distance v-b.

In a separating station 136 following the free-cutting station 128, the gasket plate 132a located further forwards in the direction of feed 108 and the gasket plate 132b located further rearwards in the direction of feed 108 are separated completely from one another by means of (for example) three separating punches.

The lateral separating areas 138 punched out of the sheet metal by the separating punches of the separating station 136 and the central separating area 140 overlap the free-cutting areas 129 cut out by the free-cutting punches of the free-cutting station 128 such that the outer contour lines cut by the free-cutting punches and by the separating punches adjoin one another smoothly and without any formation of corners.

The outer contour lines of the adjacent gasket plates 132a, 132b cut by the separating punches of the separating station 136 are also cut by different cutting edges which are spaced from one another by at least the distance v-b.

In addition to those described above, additional machining stations 122, for example, embossing stations can be provided in the follow-on combination tool 114.

Furthermore, empty stations, in which the sheet metal is not machined, can also be provided between two consecutive machining stations 122.

Figure 4:
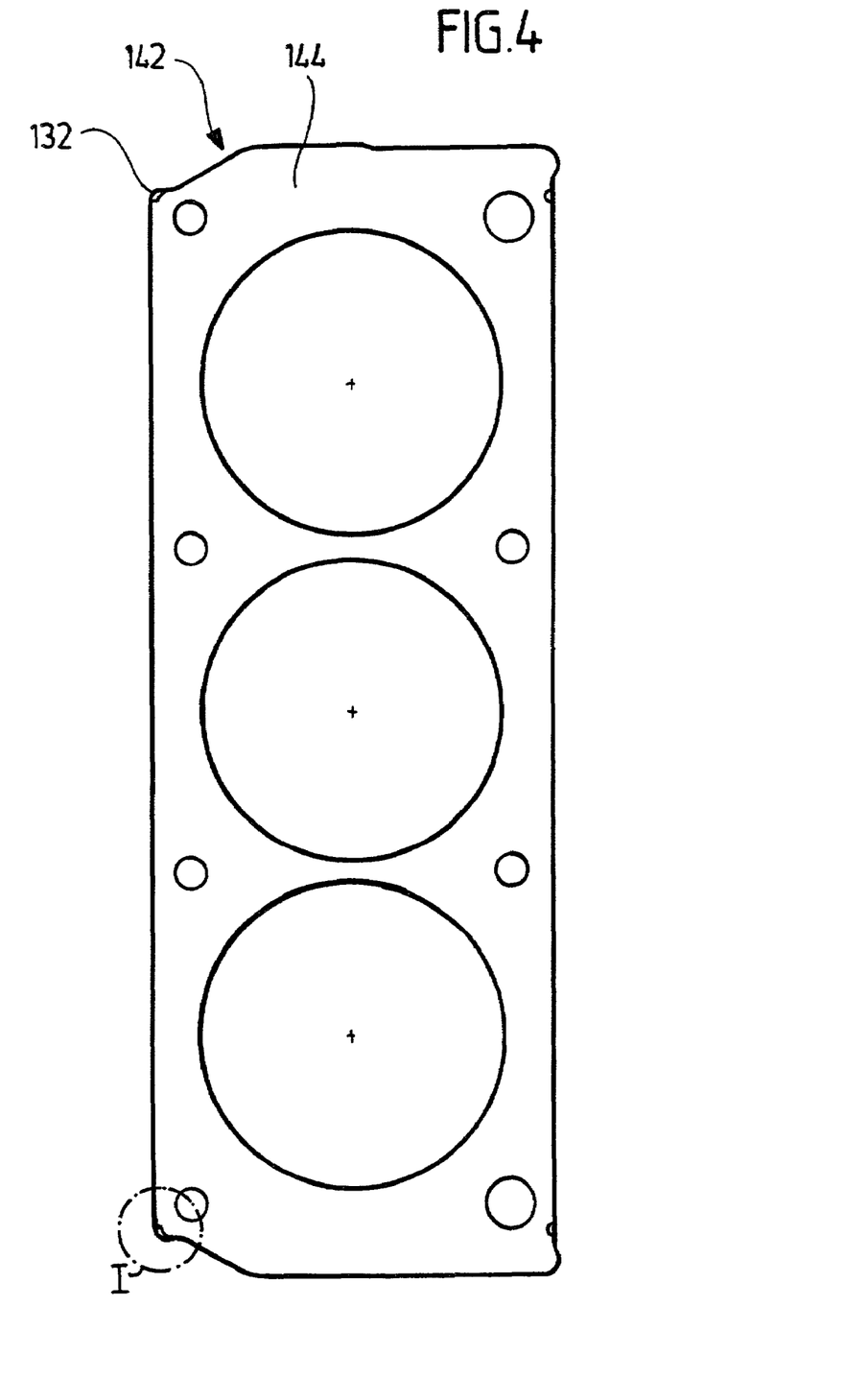
FIG. 4 shows a schematic plan view of a multiple layered metal gasket.
Figures 5, 6:
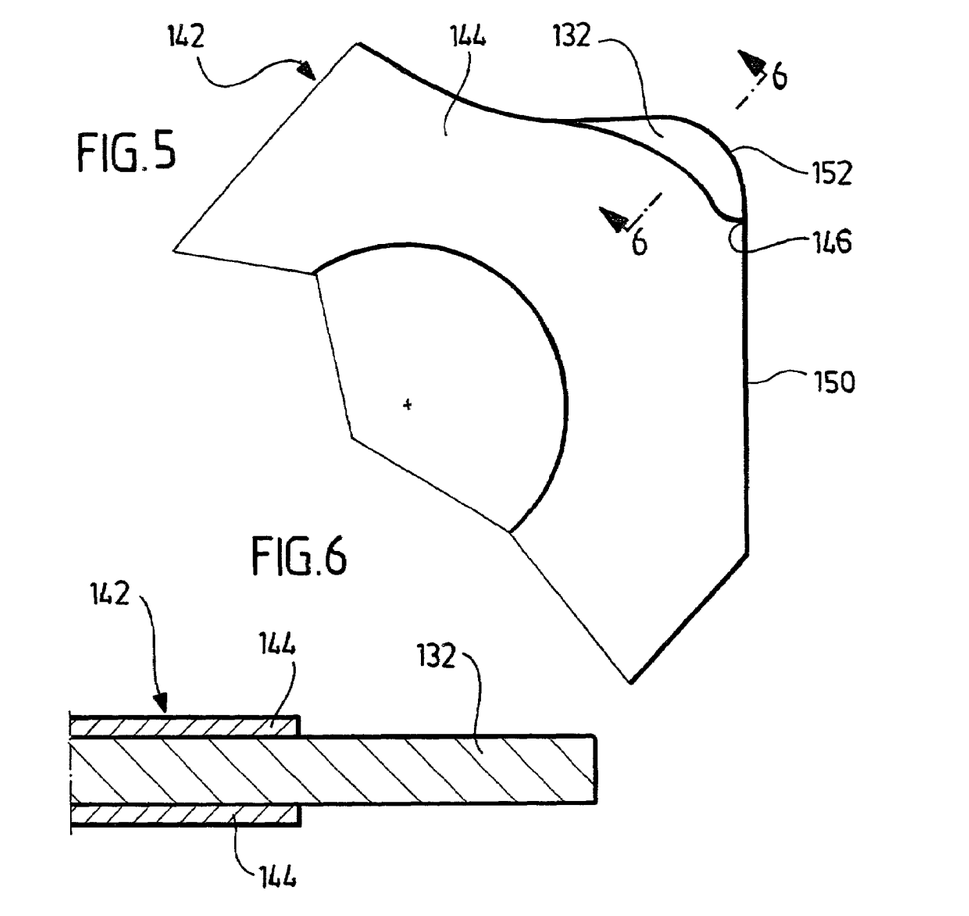
FIG. 5 shows an enlarged illustration of the area I from FIG. 4.
FIG. 6 shows a schematic longitudinal section through the gasket from FIGS. 4 and 5 along line 6—6 in FIG. 5.

The gasket plate 132 produced with the follow-on combination tool 114 described above has a rounded, corner-free outer contour and is used as central layer of a three-layered metal gasket 142 illustrated in FIGS. 4 to 6.

Figure 3:
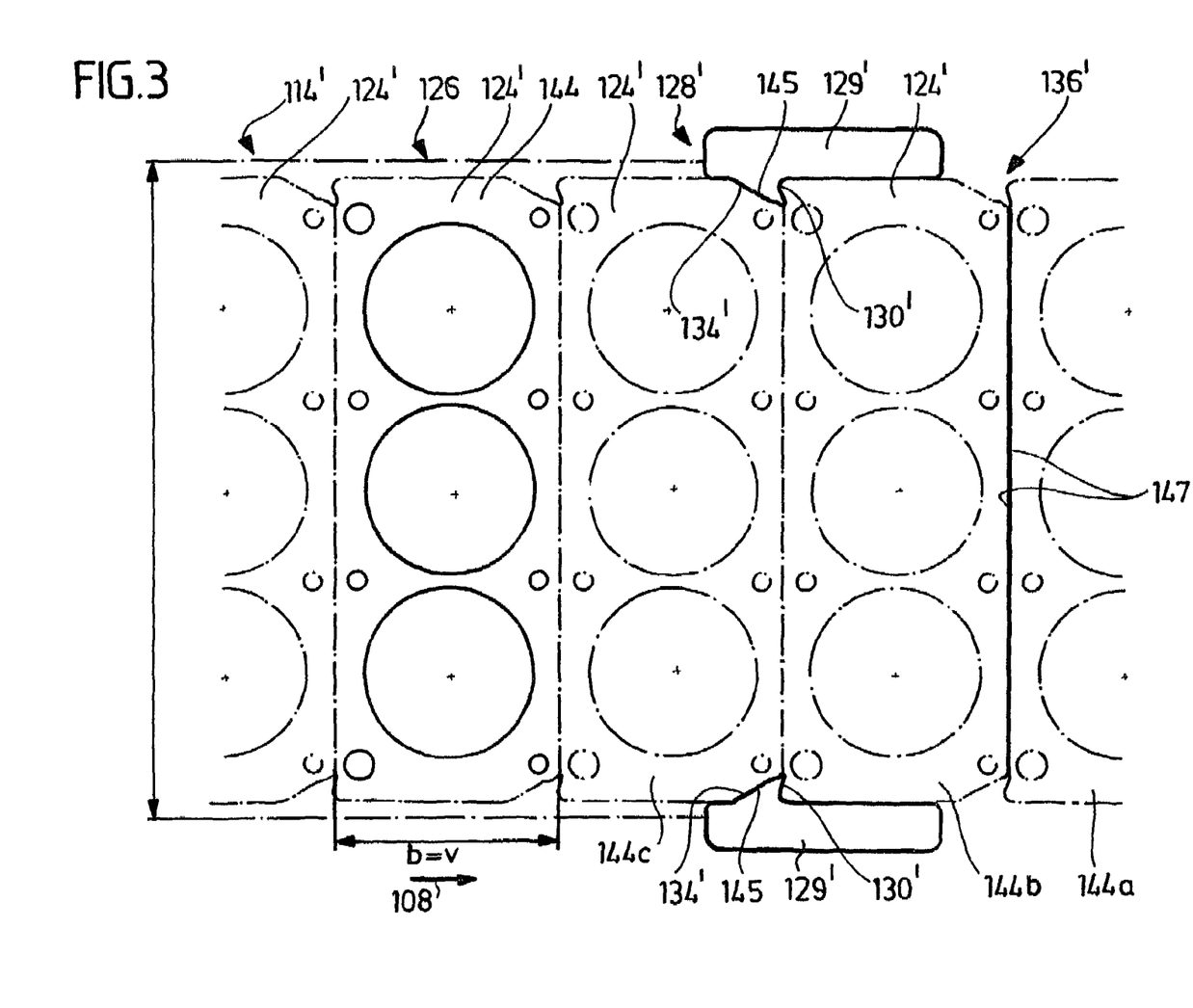
FIG. 3 shows a schematic illustration of the consecutive machining steps in a follow-on combination tool, in which the facing outer contour lines of adjacent gasket plates are cut with the same cutting edge and with which the feed distance is the same as the extension of a finished gasket plate along the direction of feed.

FIG. 3 shows schematically the consecutive machining steps in a modified follow-on combination tool 114', with which the feed distance v is the same as the width b of the outer contour of a finished gasket plate 144, i.e. is the same as the extension of the finished gasket plate 144 along the direction of feed 108.

This modified follow-on combination tool 114' also comprises a first machining station designed as a punching station 126, in which the necessary openings are generated in the gasket plate 144 by means of suitable punches.

In a second machining station which follows the punching station 126 along the direction of feed 108 and which is designed as a free-cutting station 128', two lateral free-cutting areas 129' are cut out of the sheet metal by means of (for example) two free-cutting punches, the front edges 130' of these free-cutting areas forming outer contour lines of a gasket plate 144b located further forwards in the direction of feed 108 whereas their rear edges 134' form outer contour lines of a gasket plate 144c located further rearwards in the direction of feed 108.

In a separating station 136' following the free-cutting station 128', the gasket plate 144a located further forwards in the direction of feed 108 and the gasket plate 144b located further rearwards in the direction of feed 108 are separated completely from one another by means of a separating punch.

Figure 7:
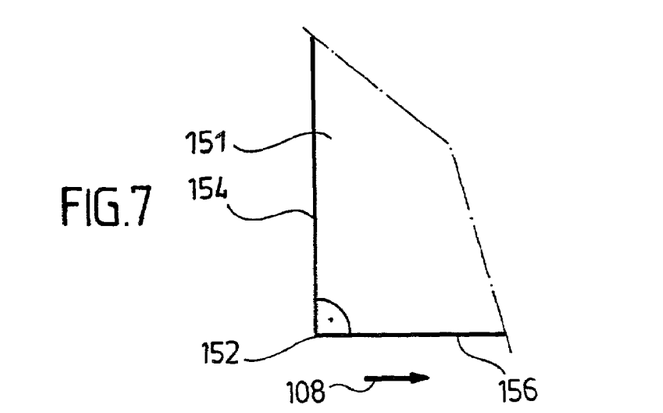
FIG. 7 shows a schematic longitudinal section through a separating punch of a follow-on combination tool.

The separating punch 151 of the separating station 136' has only one single (for example) straight-lined cutting edge 152, wherein the surfaces 154 and 156 of the separating punch 151 forming the cutting edge 152 form with one another an angle of approximately 90° (cf. FIG. 7).

Since the outer contour lines 147 of the adjacent gasket plates 144*a*, 144*b* which coincide with one another are cut by one and the same cutting edge, the cutting force to be used for the separation of the gasket plates 144*a*, 144*b* and the noise generated during the cutting are less than in the case of the free-cutting punches of the free-cutting station 128 and in the case of the central separating punch of the separating station 136 of the conventional follow-on combination tool 114 which each have two different cutting edges spaced from one another by the distance v-b.

The cutting edge of the separating punch of the separating station 136' of the follow-on combination tool 114' dips during the separating procedure into the lateral free-cutting areas 129' cut by the free-cutting station 128' so that the outer contour lines 147 of the gasket plates 144*a*, 144*b* are cleanly cut and the edges of the gasket plates 144*a*, 144*b* are not bent.

The edges of the lateral free-cutting areas 129' extend essentially at right angles to the outer contour lines of the gasket plates 144*a*, 144*b* cut by the separating punch of the separating station 136'. As a result, it is possible to use in the free-cutting station 129' those free-cutting punches which have a rounded, corner-free shape to their cutting edges.

In order for the outer contour lines 147 cut by the separating punch of the separating station 136' to adjoin smoothly, i.e. without any formation of corners, onto the edges of the lateral free-cutting areas 129', the free-cutting punches of the free-cutting station 128' would, on the other hand, have to taper very considerably in order to form two cutting edges extending tangentially to one another. Such free-cutting punches would, however, be very difficult to produce and would be subject to high wear and tear. This disadvantage is avoided in the case of the follow-on combination tool 114' due to the fact that the edges of the lateral free-cutting areas 129' extend transversely, preferably essentially at right angles, to the outer contour lines 147 cut by the separating punch of the separating station 136'.

However, due to this measure a sharp-edged transition results on the finished gasket plate 144' between the free-cutting lines 145 cut by the free-cutting punches of the free-cutting station 128', on the one hand, and the outer contour line 147 cut by the separating punch of the separating station 136', on the other hand, with a corner 146 at the point, at which the above-mentioned lines meet one another.

Additional machining stations 122, for example, embossing stations can be provided in the follow-on combination tool 114', as well, in addition to those described above.

Furthermore, empty stations, in which the sheet metal is not machined, can also be provided in the follow-on combination tool 114' between two consecutive machining stations 122.

Gasket plates 144 produced with the follow-on combination tool 114' described above are used as the upper and as the lower cover layer of the three-layered metal gasket 142 illustrated in FIGS. 4 to 6 and are connected to the gasket plate 132 forming the central layer, for example, by way of welding or by means of rivets.

As is apparent from FIG. 5, the gasket plates 132 and 144 are designed and aligned in the metal gasket 142 relative to one another such that the outer contour of the gasket plate 132 has a first outer contour line section 150 which follows the course of the outer contour line 147 cut by the separating punch of the separating station 136' and a second outer contour line section 152 which smoothly adjoins the first outer contour line section 150 of the gasket plate 132 in the area of the corner 146 of the gasket plate 144 such that the corner 146 on the gasket plate 144 is covered by the gasket plate 132 and, altogether, a smooth, rounded outer geometry of the metal gasket 142 results which has no sharp outer edges which could cause the risk of injury during the handling of the metal gasket 142.

Figure 8:
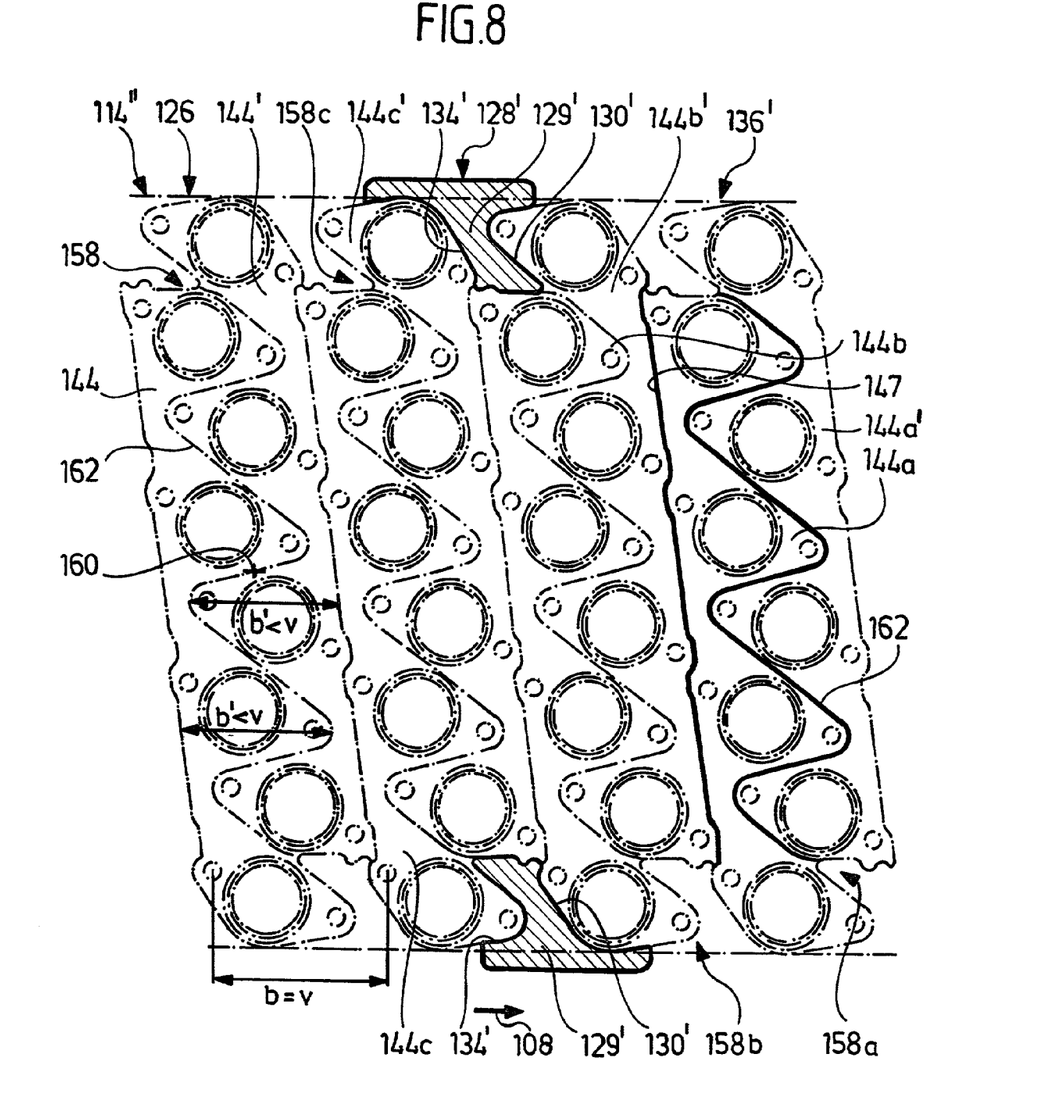
FIG. 8 shows a schematic illustration of the consecutive machining steps in a follow-on combination tool, in which the facing outer contour lines of adjacent gasket plates are cut with the same cutting edge and with which the feed distance is the same as the extension of a group of finished gasket plates along the direction of feed.

FIG. 8 shows schematically the consecutive machining steps in a second embodiment of a modified follow-on combination tool 114", with which the feed distance v is the same as the width b of the outer contour of a group 158 of gasket plates which comprises two gasket plates 144 and 144'.

As is apparent from FIG. 8, the second gasket plate 144' has the same outer contour as the first gasket plate 144 of the group 158 of gasket plates but is turned through 180° relative to the first gasket plate 144 and displaced relative to the first gasket plate 144 transversely to the direction of feed 108 so that the two gasket plates 144, 144' of the same group 158 of gasket plates are designed and arranged so as to be point symmetric to one another with respect to a point 160.

The two gasket plates 144 and 144' of the same group 158 of gasket plates border on one another along outer contour lines 162 coinciding with one another.

The width b of the outer contour of the group 158 of gasket plates corresponds to the extension of the group 158 of gasket plates along the direction of feed 108 and is greater than the width b' of the outer contour of one of the gasket plates 144 or 144', i.e., greater than the extension of the finished gasket plate 144 or of the finished gasket plate 144' along the direction of feed 108.

This modified follow-on combination tool 114" also comprises a first machining station which is designed as a punching station 126 and in which the necessary openings are generated in the gasket plates 144 and 144' by means of suitable punches.

In a second machining station which follows the punching station 126 along the direction of feed 108 and is designed as a free-cutting station 128', two lateral free-cutting areas 129' are cut out of the sheet metal by means of (for example) two free-cutting punches, the front edges 130' of these free-cutting areas forming outer contour lines of a gasket plate 144*b* and a gasket plate 144*b'* of a group 158*b* of gasket plates located further forwards in the direction of feed 108 whereas their rear edges 134' form outer contour lines of a gasket plate 144*c* and a gasket plate 144*c'* of a group 158*c* of gasket plates located further rearwards in the direction of feed 108.

In a separating station 136' following the free-cutting station 128', the gasket plate 144*a* of the group 158*a* of gasket plates located further forwards in the direction of feed 108 and the gasket plate 144*b'* of the group 158*b* of gasket plates located further rearwards in the direction of feed 108 are separated completely from one another by means of a separating punch.

In the same separating station 136', the second gasket plate 144*a'* of the group 158*a* of gasket plates located further forwards in the direction of feed 108 is also separated completely from the gasket plate 144*a* of the group 158*a* of gasket plates located further rearwards in the direction of feed 108 by means of a separating punch.

The adjacent gasket plates 144*a* and 144*b*' which belong to different groups 158*a* and 158*b*, respectively, of gasket plates, on the one hand, and the two gasket plates 144*a* and 144*a*' belonging to the same group 158*a* of gasket plates, on the other hand, can be separated from one another either with two different separating punches or by means of different cutting edges of the same separating punch.

In any case, the outer contour lines 147 of the adjacent gasket plates 144*a*, 144*b*' which coincide with one another are cut by one and the same cutting edge.

The outer contour lines 162 of the gasket plates 144*a*, 144*a*' belonging to the same group 158*a* of gasket plates, which coincide with one another, are likewise cut by one and the same cutting edge.

The cutting edges of the separating punch or the separating punches of the separating station 136' of the follow-on combination tool 114" dip during the separating procedure into the lateral free-cutting areas 129' cut by the free-cutting station 128' so that the outer contour lines 147 of the gasket plates 144*a*, 144*b*' and the outer contour lines 162 of the gasket plates 144*a*, 144*a*'0 belonging to the group 158*a* of gasket plates are cut cleanly and the edges of these gasket plates are not bent.

As for the rest, the second embodiment of a modified follow-on combination tool 114" corresponds with respect to construction and function to the first embodiment of a modified follow-on combination tool 114', reference being made in this respect to its description above.

The present disclosure relates to the subject matter disclosed in German Patent Application No. 100 31 095.8 of Jun. 30, 2000, the entire specification of which is incorporated herein by reference.

What is claimed is:

1. Process for the production of a multi-plate gasket comprising at least a first metal gasket plate and a second metal gasket plate, wherein said first gasket plate is produced from one respective gasket plate section of a starting material comprising several continuous gasket plate sections, wherein the gasket plate sections are machined during operating cycles in a follow-on combination tool having several machining stations following one another along a direction of feed, wherein at least one of the machining stations is designed as a station for cutting outer contour lines, facing outer contour lines of two adjacent gasket plates being cut in said station by means of a tool for cutting outer contour lines, and wherein the gasket plate sections are moved further along the direction of feed by a feed distance by means of a feeding device between two operating cycles, wherein the outer contour lines of the two adjacent gasket plates are cut with the same cutting edge of the tool for cutting outer contour lines and wherein the feed distance is selected to be essentially the same as the extension of the outer contour of a finished gasket plate or a group of finished gasket plates along the direction of feed, wherein the outer contour of said first gasket plate is provided with a pointed corner, wherein said second gasket plate is produced by means of a follow-on combination tool, the feed distance with said tool being greater than the extension of the outer contour of said second gasket plate along the direction of feed, and wherein said first gasket plate and said second gasket plate are disposed one on the other to form said multi-plate gasket such that a corner-free outer contour of said second gasket plate projects beyond said pointed corner on said first gasket plate such that the first metal gasket plate and the second metal gasket plate collectively provide an outermost contour of said multi-plate gasket that is corner-free.

2. Process as defined in claim 1, wherein the adjacent gasket plates are separated completely from one another in the station for cutting outer contour lines designed as a separating station.

3. Process as defined in claim 2, wherein the station for cutting outer contour lines is the last machining station of the follow-on combination tool in the direction of feed.

4. Process as defined in claim 1, wherein the outer contour lines are cut in the station for cutting outer contour lines by means of a cutting edge formed by surfaces of the tool for cutting outer contour lines forming with one another an angle of approximately 90°.

5. Process as defined in claim 1, wherein the feed distance is selected to be essentially the same as the extension of the outer contour of a group of finished gasket plates and that adjacent gasket plates of the group are separated completely from one another in a separating station.

6. Process as defined in claim 5, wherein the group of gasket plates comprises at least two gasket plates, the facing outer contour lines of said plates being cut with the same cutting edge of a tool for cutting outer contour lines.

7. Process as defined in claim 5, wherein the group of gasket plates comprises at least two gasket plates, the outer contour lines of said plates being designed to be essentially point symmetric to one another.

8. Process as defined in claim 1, wherein at least one of the machining stations is designed as a free-cutting station arranged in front of the station for cutting outer contour lines in the direction of feed, at least one free-cutting area being cut out of the starting material in said free-cutting station, the cutting edge of the tool for cutting outer contour lines of the station for cutting outer contour lines dipping into said free-cutting area during the cutting procedure.

9. Process as defined in claim 8, wherein the free-cutting area is cut by the free-cutting tool of the free-cutting station such that the edge of the free-cutting area extends transversely to the outer contour lines cut by the tool for cutting outer contour lines.

10. Process as defined in claim 9, wherein the free-cutting area is cut by the free-cutting tool of the free-cutting station such that the edge of the free-cutting area extends essentially at right angles to the outer contour lines cut by the tool for cutting outer contour lines.

11. Gasket, comprising at least a first metal gasket plate and a second metal gasket plate disposed one on the other to form a multi-plate gasket, wherein an outer contour of a cut edge of the first metal gasket plate comprises a free-cutting line and an outer contour line, said free-cutting and outer contour lines together forming a pointed corner, and wherein a corner-free cut edge of said second metal gasket plate projects beyond the pointed corner on the first metal gasket plate when said first metal gasket plate and said second metal gasket plate are disposed one on the other in said multi-plate gasket such that the first metal gasket plate and the second gasket plate collectively provide an outermost contour of said multi-plate gasket that is corner-free.

12. Gasket, comprising at least a first metal gasket plate and a second metal gasket plate disposed one on the other to form a multi-plate gasket, wherein an outer contour of a cut edge of the first gasket plate comprises a free-cutting line and an outer contour line, said free-cutting and outer contour lines together forming a pointed corner, and wherein a cut edge of said second gasket plate comprises a first outer contour line section following a course of the outer contour line of the first gasket plate or a course of the free-cutting line of the first gasket plate when said first gasket plate and said second gasket plate are disposed one on the other in said multi-plate gasket, and a second outer contour line section smoothly adjoining said first outer contour line section of the second gasket plate in the area of the pointed corner of the first gasket plate to provide a corner-free cut edge that projects beyond the pointed corner when said first gasket plate and said second gasket plate are disposed one on the other in said multi-plate gasket such that the first metal gasket plate and the second metal gasket plate collectively provide an outermost contour of said multi-plate gasket that is corner-free.

13. Gasket as defined in claim 12, wherein the second gasket plate is produced by means of a follow-on combination tool, the feed distance with said tool being greater than the extension of the outer contour of the finished gasket plate along the direction of feed.

14. Process for the production of a multi-plate gasket comprising at least a first metal gasket plate and a second metal gasket plate, wherein said first gasket plate is produced from one respective gasket plate section of a starting material comprising several continuous gasket plate sections, wherein the gasket plate sections are machined during operating cycles in a follow-on combination tool having several machining stations following one another along a direction of feed, wherein at least one of the machining stations is designed as a station for cutting outer contour lines, facing outer contour lines of two adjacent gasket plates being cut in said station by means of a tool for cutting outer contour lines, and wherein the gasket plate sections are moved further along the direction of feed by a feed distance by means of a feeding device between two operating cycles, wherein the outer contour lines of the two adjacent gasket plates are cut with the same cutting edge of the tool for cutting outer contour lines and wherein the feed distance is selected to be essentially the same as the extension of the outer contour of a finished gasket plate or a group of finished gasket plates along the direction of feed, wherein the outer contour of said first gasket plate is provided with a pointed corner, wherein said second gasket plate is produced by means of a follow-on combination tool, the feed distance with said tool being greater than the extension of the outer contour of said second gasket plate along the direction of feed, and wherein said first gasket plate and said gasket plate are disposed one on the other to form said multi-plate gasket such that a first outer contour line section of said second gasket plate follows a course of an outer contour line of said first gasket plate and a second outer contour line section of said second gasket plate smoothly adjoins said first outer contour line section of said second gasket layer in the area of said pointed corner of said first gasket plate to provide a corner-free outer contour that projects beyond the pointed corner such that the first metal gasket plate and the second metal gasket plate collectively provide an outermost contour of said multi-plate gasket that is corner-free.

15. Gasket, comprising a first metal gasket plate, a second metal gasket plate, and an intermediate metal gasket plate disposed between the first metal gasket plate and the second metal gasket plate to form a multi-plate gasket, wherein an outer contour of a cut edge of the first metal gasket plate and an outer contour of a cut edge of the second metal gasket plate each comprises a free-cutting line and an outer contour line, said free-cutting and outer contour lines together forming a pointed corner on the first metal gasket plate and the second metal gasket plate, and wherein a corner-free cut edge of said intermediate metal gasket plate projects beyond the pointed corner of the first metal gasket plate and the pointed corner of the second metal gasket plate when said first metal gasket plate, said intermediate metal gasket plate, and said second metal gasket plate are disposed one on the other in said multi-plate gasket such that said first metal gasket plate, said intermediate gasket plate, and said second gasket plate collectively provide an outermost contour of said multi-plate gasket that is corner-free.

* * * * *

UNITED STATES PATENT AND TRADEMARK OFFICE
CERTIFICATE OF CORRECTION

PATENT NO. : 6,957,486 B2  Page 1 of 1
APPLICATION NO. : 09/892052
DATED : October 25, 2005
INVENTOR(S) : Wolfgang Fritz It is certified that error appears in the above-identified patent and that said Letters Patent is hereby corrected as shown below:

Replace [73] Assignee: with --ElringKlinger AG, Dettingen (DE)--.

Signed and Sealed this

Fourth Day of July, 2006

JON W. DUDAS
*Director of the United States Patent and Trademark Office*